US009408038B2

(12) United States Patent
Singh et al.

(10) Patent No.: US 9,408,038 B2
(45) Date of Patent: Aug. 2, 2016

(54) FILTERING OUT ACCESS POINT DATA BASED ON NON-CONFORMITY WITH OTHER ACCESS POINT DATA

(71) Applicant: Aruba Networks, Inc., Sunnyvale, CA (US)

(72) Inventors: Abhishek R. Singh, Pleasanton, CA (US); Anant Kumar, San Jose, CA (US)

(73) Assignee: ARUBA NETWORKS, INC., Sunnyvale, CA (US)

( * ) Notice: Subject to any disclaimer, the term of this patent is extended or adjusted under 35 U.S.C. 154(b) by 0 days.

(21) Appl. No.: 14/262,599

(22) Filed: Apr. 25, 2014

(65) Prior Publication Data

US 2015/0312724 A1   Oct. 29, 2015

(51) Int. Cl.
*H04W 4/04* (2009.01)

(52) U.S. Cl.
CPC ...................................... *H04W 4/04* (2013.01)

(58) Field of Classification Search
CPC ...... H04W 64/00; H04W 4/028; H04W 4/025
See application file for complete search history.

(56) References Cited

U.S. PATENT DOCUMENTS

2005/0246334 A1\* 11/2005 Tao et al. .......................... 707/5
2013/0257657 A1\* 10/2013 Garin et al. ................... 342/451
2015/0094085 A1\*  4/2015 Agrawal et al. ............ 455/456.1

\* cited by examiner

*Primary Examiner* — Kashif Siddiqui
*Assistant Examiner* — Minjung Kim
(74) *Attorney, Agent, or Firm* — Hewlett Packard Enterprise Patent Department

(57) ABSTRACT

Methods and systems are described for filtering out signal strength data associated with access points and a client device using heuristic and intra-access point analysis. The filtered data may be used to approximate the location of the client device. By filtering signal strength values through a heuristic and intra-access point analysis; the systems and methods described eliminate inaccurate or anomalistic values, which may negatively alter the estimated location of the client device. Accordingly, the systems and methods may produce more accurate client device location estimates by intelligently examining detected signal strength values.

14 Claims, 9 Drawing Sheets

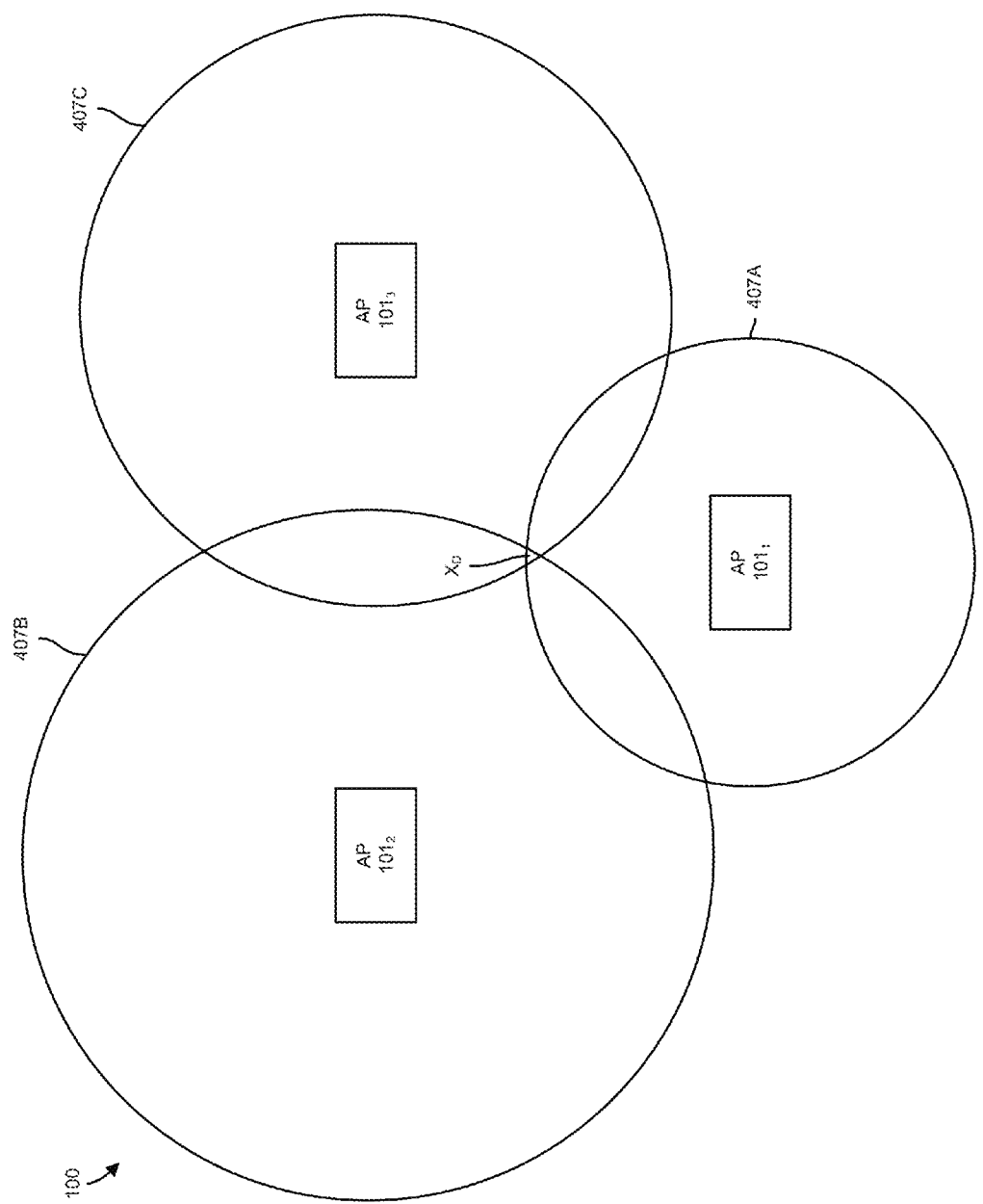

600

| AP 101₁ | | | | | AP 101₂ |
|---|---|---|---|---|---|
| | 601A<br>Exp. Sig.={18.59,<br>14.90, 14.90, 12.93}<br><br>Error Vec.={-2.59,<br>-0.90, 2.10, 2.07} | 601B<br>Exp. Sig.={17.76,<br>15.88, 14.61, 13.60}<br><br>Error Vec.={-1.76,<br>-1.88, 2.39, 1.40} | 601C<br>Exp. Sig.={16.84,<br>16.84, 14.17, 14.17}<br><br>Error Vec.={-0.84,<br>-2.84, 2.83, 0.83} | 601D<br>Exp. Sig.={15.88,<br>17.76, 13.60, 14.61}<br><br>Error Vec.={0.12,<br>-3.76, 3.40, 0.39} | 601E<br>Exp. Sig.={14.90,<br>18.59, 12.93, 14.90}<br><br>Error Vec.={1.10,<br>-4.59, 4.07, 0.10} | |
| | 601F<br>Exp. Sig.={17.76,<br>14.61, 15.88, 13.60}<br><br>Error Vec.={-1.76,<br>-0.61, 1.12, 1.40} | 601G<br>Exp. Sig.={17.17,<br>15.53, 15.53, 14.34}<br><br>Error Vec.={-1.17,<br>-1.53, 1.47, 0.66} | 601H<br>Exp. Sig.={16.39,<br>16.39, 15.00, 15.00}<br><br>Error Vec.={-0.39,<br>-2.39, 2.00, 0.00} | 601I<br>Exp. Sig.={15.53,<br>17.17, 14.34, 15.53}<br><br>Error Vec.={0.47,<br>-3.17, 2.66, -0.53} | 601J<br>Exp. Sig.={14.61,<br>17.76, 13.60, 15.88}<br><br>Error Vec.={1.39,<br>-3.76, 3.40, -0.88} | |
| | 601K<br>Exp. Sig.={16.84,<br>14.17, 16.84, 14.17}<br><br>Error Vec.={-0.84,<br>-0.17, 0.16, 0.83} | 601L<br>Exp. Sig.={16.39,<br>15.00, 16.39, 15.00}<br><br>Error Vec.={-0.39,<br>-1.00, 0.61, 0.00} | 601M<br>Exp. Sig.={15.76,<br>15.76, 15.76, 15.76}<br><br>Error Vec.={0.24,<br>-1.76, 1.24, -0.76} | 601N<br>Exp. Sig.={15.00,<br>16.39, 15.00, 16.39}<br><br>Error Vec.={1.00,<br>-2.39, 2.00, -1.39} | 601O<br>Exp. Sig.={14.17,<br>16.84, 14.17, 16.84}<br><br>Error Vec.={1.83,<br>-2.84, 2.83, -1.84} | |
| | 601P<br>Exp. Sig.={15.88,<br>13.60, 17.76, 14.61}<br><br>Error Vec.={0.12,<br>0.40, -0.76, 0.39} | 601Q<br>Exp. Sig.={15.53,<br>14.34, 17.17, 15.53}<br><br>Error Vec.={0.47,<br>-0.34, -0.17, -0.53} | 601R<br>Exp. Sig.={15.00,<br>15.00, 16.39, 16.39}<br><br>Error Vec.={1.00,<br>-1.00, 0.61, -1.39} | 601S<br>Exp. Sig.={14.34,<br>15.53, 15.53, 17.17}<br><br>Error Vec.={1.66,<br>-1.53, 1.47, -2.17} | 601T<br>Exp. Sig.={13.60,<br>15.88, 14.61, 17.76}<br><br>Error Vec.={2.40,<br>-1.88, 2.39, -2.76} | |
| | 601U<br>Exp. Sig.={14.90,<br>12.93, 18.59, 14.90}<br><br>Error Vec.={1.10,<br>1.07, -1.59, 0.10} | 601V<br>Exp. Sig.={14.61,<br>13.60, 17.76, 15.88}<br><br>Error Vec.={1.39,<br>0.40, -0.76, -0.88} | 601W<br>Exp. Sig.={14.17,<br>14.17, 16.84, 16.84}<br><br>Error Vec.={1.83,<br>-0.17, 0.16, -1.84} | 601X<br>Exp. Sig.={13.60,<br>14.61, 15.88, 17.76}<br><br>Error Vec.={2.40,<br>-0.61, 1.12, -2.76} | 601Y<br>Exp. Sig.={12.93,<br>14.90, 14.90, 18.59}<br><br>Error Vec.={3.07,<br>-0.90, 2.10, -3.59} | |
| AP 101₃ | | | | | AP 101₄ |

FIG. 6C

FILTERING OUT ACCESS POINT DATA BASED ON NON-CONFORMITY WITH OTHER ACCESS POINT DATA

TECHNICAL FIELD

The present disclosure relates to filtering out signal strength data associated with a network device and a client device when the signal strength data fails to correlate with other pieces of signal strength data associated with the client device. This filtered data may be used to produce more accurate client device location estimates by intelligently examining detected signal strength values.

BACKGROUND

Over the last decade, there has been a substantial increase in the use and deployment of network devices. For example, smartphones, laptop computers, desktop computers, tablet computers, and smart appliances may each communicate over wireless switching networks. Commonly, the location of these devices may be determined using a variety of techniques.

For example, strength characteristics of signals transmitted by a wireless device and received by a set of access points may be examined to triangulate the position of the wireless device. However, the strength characteristics for one or more of these wireless signals may be inaccurate or skewed based on anomalies in the transmission environment. As a result, the estimated location of the wireless device, which may be calculated partially based on these inaccurate strength characteristics, may also be inaccurate.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings:

FIG. 4B shows a detected current location of the client device based on distances from a set of access points according to one embodiment.

FIG. 6C shows each of the cells with corresponding expected signal strength values and error vectors according to one embodiment.

DETAILED DESCRIPTION

Figure 1:
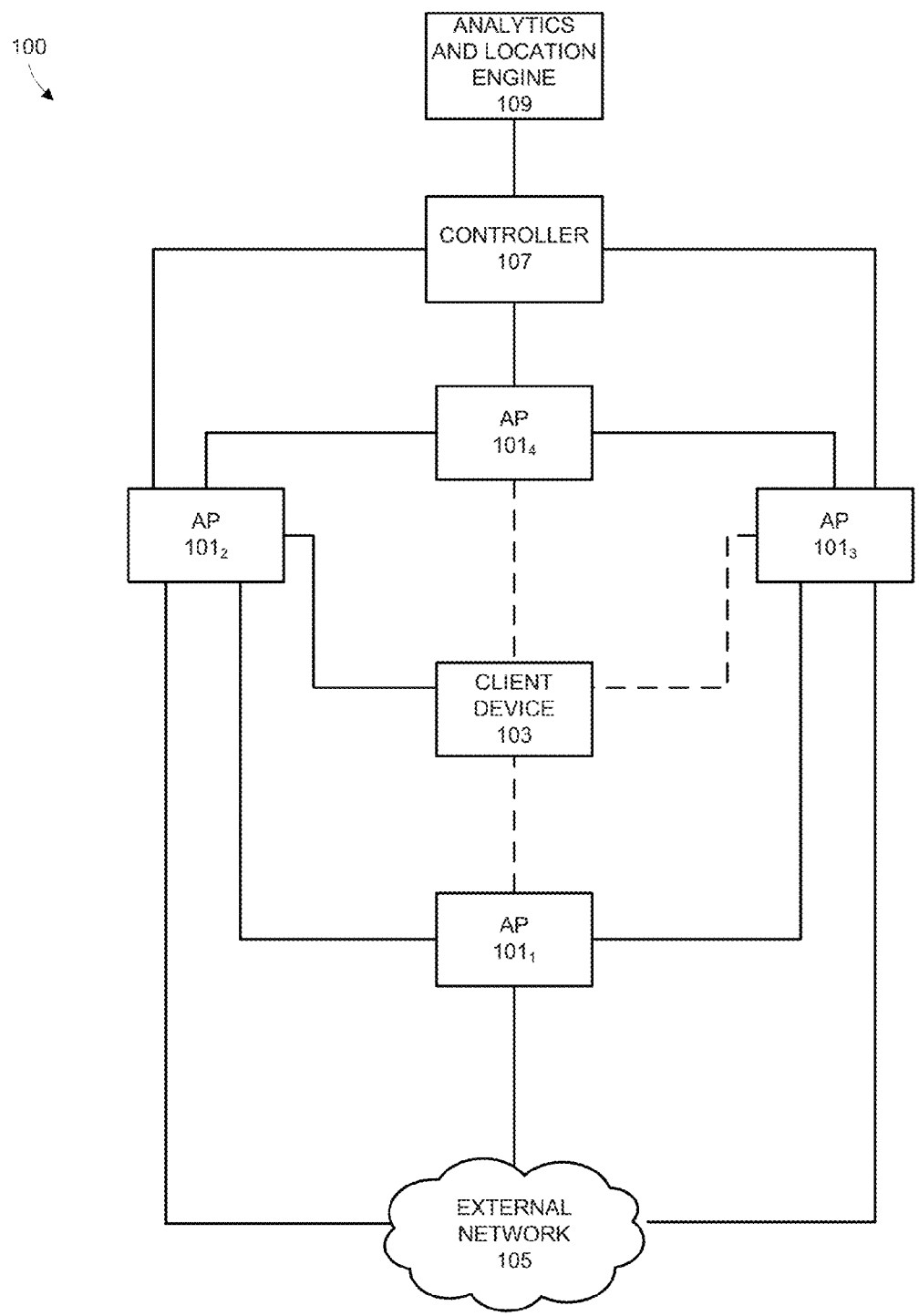
FIG. 1 shows a block diagram example of a network system in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

Herein, certain terminology is used to describe features for embodiments of the disclosure. For example, the term "digital device" generally refers to any hardware device that includes processing circuitry running at least one process adapted to control the flow of traffic into the device. Examples of digital devices include a computer, a tablet, a laptop, a desktop, a netbook, a server, a web server, an authentication server, an authentication-authorization-accounting (AAA) server, a Domain Name System (DNS) server, a Dynamic Host Configuration Protocol (DHCP) server, an Internet Protocol (IP) server, a Virtual Private Network (VPN) server, a network policy server, a mainframe, a television, a content receiver, a set-top box, a video gaming console, a television peripheral, a printer, a mobile handset, a smartphone, a personal digital assistant "PDA", a wireless receiver and/or transmitter, an access point, a base station, a communication management device, a router, a switch, and/or a controller.

It is contemplated that a digital device may include hardware logic such as one or more of the following: (i) processing circuitry; (ii) one or more communication interfaces such as a radio (e.g., component that handles the wireless data transmission/reception) and/or a physical connector to support wired connectivity; and/or (iii) a non-transitory computer-readable storage medium (e.g., a programmable circuit; a semiconductor memory such as a volatile memory and/or random access memory "RAM," or non-volatile memory such as read-only memory, power-backed RAM, flash memory, phase-change memory or the like; a hard disk drive; an optical disc drive; etc.) or any connector for receiving a portable memory device such as a Universal Serial Bus "USB" flash drive, portable hard disk drive, or the like.

Herein, the terms "logic" (or "logic unit") are generally defined as hardware and/or software. For example, as hardware, logic may include a processor (e.g., a microcontroller, a microprocessor, a CPU core, a programmable gate array, an application specific integrated circuit, etc.), semiconductor memory, combinatorial logic, or the like. As software, logic may be one or more software modules, such as executable code in the form of an executable application, an application programming interface (API), a subroutine, a function, a procedure, an object method/implementation, an applet, a servlet, a routine, source code, object code, a shared library/dynamic load library, or one or more instructions. These software modules may be stored in any type of a suitable non-transitory storage medium, or transitory computer-readable transmission medium (e.g., electrical, optical, acoustical or other form of propagated signals such as carrier waves, infrared signals, or digital signals).

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

Network System

FIG. 1 shows a block diagram example of a network system 100 in accordance with one or more embodiments. The network system 100, as illustrated in FIG. 1, is a digital system that may include a plurality of digital devices such as one or more access points $101_1$-$101_4$, a client device 103, a network controller 107 and/or an analytics and/or location engine (ALE) 109. The client device 103 may be connected or associated with one or more of the access points $101_1$-$101_4$ through corresponding wireless connections. In embodiment, one or more devices in the network system 100 may operate to determine the current location of the client device 103. Each element of the network system 100 will be described below by way of example. In one or more embodiments, the network system 100 may include more or less devices than the devices illustrated in FIG. 1, which may be connected to other devices within the network system 100 via wired and/or wireless mediums. For example, in other embodiments, the network system 100 may include additional client devices 103 and/or additional access points 101.

Figure 2:
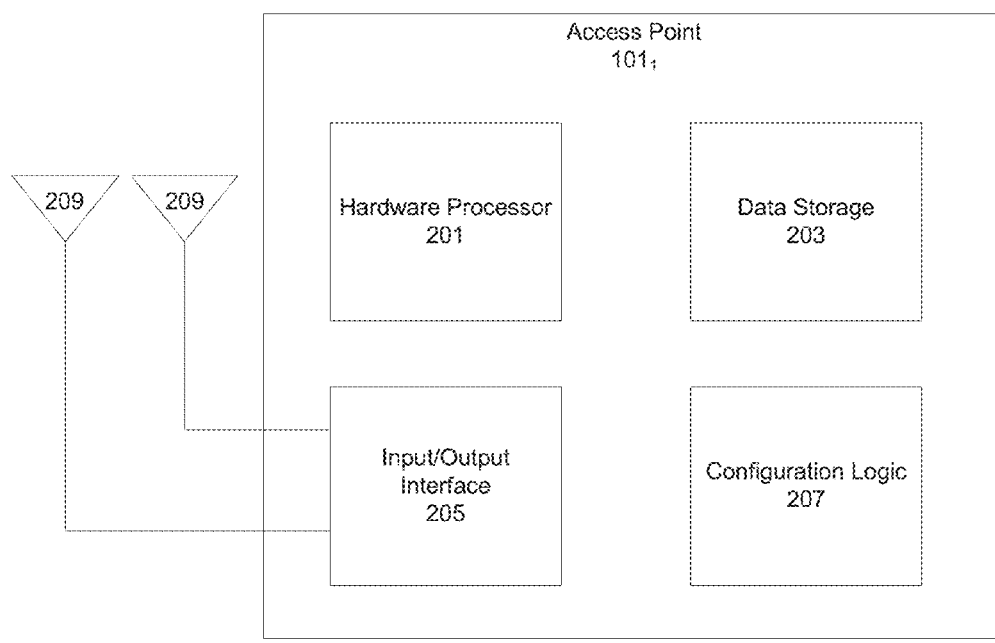
FIG. 2 shows a component diagram of an access point according to one embodiment.

The access points $101_1$-$101_4$ may be any device that can associate with the client device 103 to transmit and receive data over wireless channels and/or detect wireless signals transmitted by the client device 103. In one embodiment, the access points $101_1$-$101_4$ may correspond to a network device such as a wireless access point, a switch, a router, or any combination thereof. FIG. 2 shows a component diagram of the access point $101_1$ according to one embodiment. In other embodiments, the access points $101_2$-$101_4$ may include similar or identical components to those shown and described in relation to the access point $101_1$.

As shown in FIG. 2, the access point $101_1$ may comprise one or more of: a hardware processor 201, data storage 203, an input/output (I/O) interface 205, and device configuration logic 207. Each of these components of the access point $101_1$ will be described in further detail below.

The data storage 203 of the access point $101_1$ may include a fast read-write memory for storing programs and data during operations and a hierarchy of persistent memory, such as Read Only Memory (ROM), Erasable Programmable Read Only Memory (EPROM) and/or Flash memory for example, for storing instructions and data needed for the startup and/or operation of the access point $101_1$. In one embodiment, the data storage 203 is a distributed set of data storage components. The data storage 203 may store data that is to be transmitted from the access point $101_1$ or data that is received by the access point $101_1$. For example, the access point $101_1$ may store data to be forwarded to the client device 103 or to one or more of the access points $101_2$-$101_4$. In another embodiment, the data storage 203 may store signal strength values for one or more wireless signals received from the client device 103. These strength values may be used for estimating the location of the client device 103, as will be described in greater detail below.

In one embodiment, the I/O interface 205 corresponds to one or more components used for communicating with other devices (e.g., the client device 103, the controller 107, the ALE 109, and/or other access points $101_2$-$101_4$ within the system 100) via wired or wireless signals. The I/O interface 205 may include a wired network interface such as an IEEE 802.3 Ethernet interface and/or a wireless interface such as an IEEE 802.11 WiFi interface. The I/O interface 205 may communicate with the client device 103, the controller 107, the ALE 109, and/or the access points $101_2$-$101_4$ over corresponding wireless channels in the system 100.

In some embodiments, the I/O interface 205 may include one or more antennas 209 for communicating with the client device 103, the controller 107, the ALE 109, the access points $101_2$-$101_4$, other wireless devices in the network system 100, and/or other devices over the external network 105. For example, multiple antennas 209 may be used for forming transmission beams to one or more of the client device 103 and/or the access points $101_2$-$101_4$ through adjustment of gain and phase values for corresponding antenna 209 transmissions. The generated beams may avoid objects and create an unobstructed path to the client device 103 and/or the access $101_2$-$101_4$.

In one embodiment, the I/O interface 205 in conjunction with the antennas 209 may detect wireless signals emitted by the client device 103. In this embodiment, the client device 103 may not be directly associated with the access point $101_1$ such that the client device 103 and the access point $101_1$ maintain a data connection, but the access point $101_1$ is still able to detect the presence of the proximate/neighboring client device 103, including signal strength characteristics for corresponding wireless signals. For example, in FIG. 1 the dashed lines indicates that the client device 103 is visible to and/or in-range of the access points $101_1$, $101_3$, and $101_4$ although the access points $101_1$, $101_3$, and $101_4$ and the client device 103 may not share a data connection. Instead, the client device 103 is only associated and maintains a data connection with the access point $101_2$ (e.g., a data connection using one or more network protocols) as signified by the solid line. Accordingly, each of the access points $101_1$, $101_3$, and $101_4$ may detect nearby signals of the client device 103 even without an established data connection. Detection of these signals by the access points $101_1$-$101_4$ may be used by to determine an estimated current location of the client device 103 as will be described in greater detail below.

In one embodiment, the hardware processor 201 is coupled to the data storage 203 and the I/O interface 205. The hardware processor 201 may be any processing device including, but not limited to a MIPS/ARM-class processor, a microprocessor, a digital signal processor, an application specific integrated circuit, a microcontroller, a state machine, or any type of programmable logic array.

In one embodiment, the device configuration logic 207 includes one or more functional units implemented using firmware, hardware, software, or a combination thereof for configuring parameters associated with the access point $101_1$. In one embodiment, the device configuration logic 207 may be configured to determine a current location for the client device 103 based on signal strength characteristics corresponding to wireless signals transmitted by the client device 103.

As described above, the other access points $101_2$-$101_4$ may be similarly configured as described above in relation to the access point $101_1$. For example, access points $101_2$-$101_4$ may comprise hardware processor 201, data storage 203, input/output (I/O) interface 205, and device configuration logic 207 in a similar fashion as described above in relation to the access point $101_1$.

In one embodiment, the controller 107 and/or the ALE 109 may be similarly configured as described above in relation to the access point $101_1$. For example, the controller 107 and/or the ALE 109 may comprise hardware processor 201, data storage 203, input/output (I/O) interface 205, and device configuration logic 207 in a similar fashion as described above in relation to the access point $101_1$.

In one embodiment, the ALE 109 may be a master controller 107 in the network system 100. In this embodiment, the ALE 109 may perform one or more of the operations, which will be described below, for estimating the current location of the client device 103 based on signal strength characteristics corresponding to wireless signals transmitted by the client device 103.

In one embodiment, the client device 103 may be any wireless electronic devices capable of receiving and transmitting data over wireless mediums. For example, the client device 103 may be one or more of a personal computer, a laptop computer, a netbook computer, a wireless music player, a portable communication device, a smart phone, a tablet computer, and a digital television. In one embodiment, the client device 103 is a digital device that includes a hardware processor, memory hierarchy, and input/output (I/O) interfaces including a wired and/or wireless interface such as an IEEE 802.11 interface. In one embodiment, the configuration of the components within the client device 103 may be similar to those discussed above in relation to the access point $101_1$.

Figure 3:
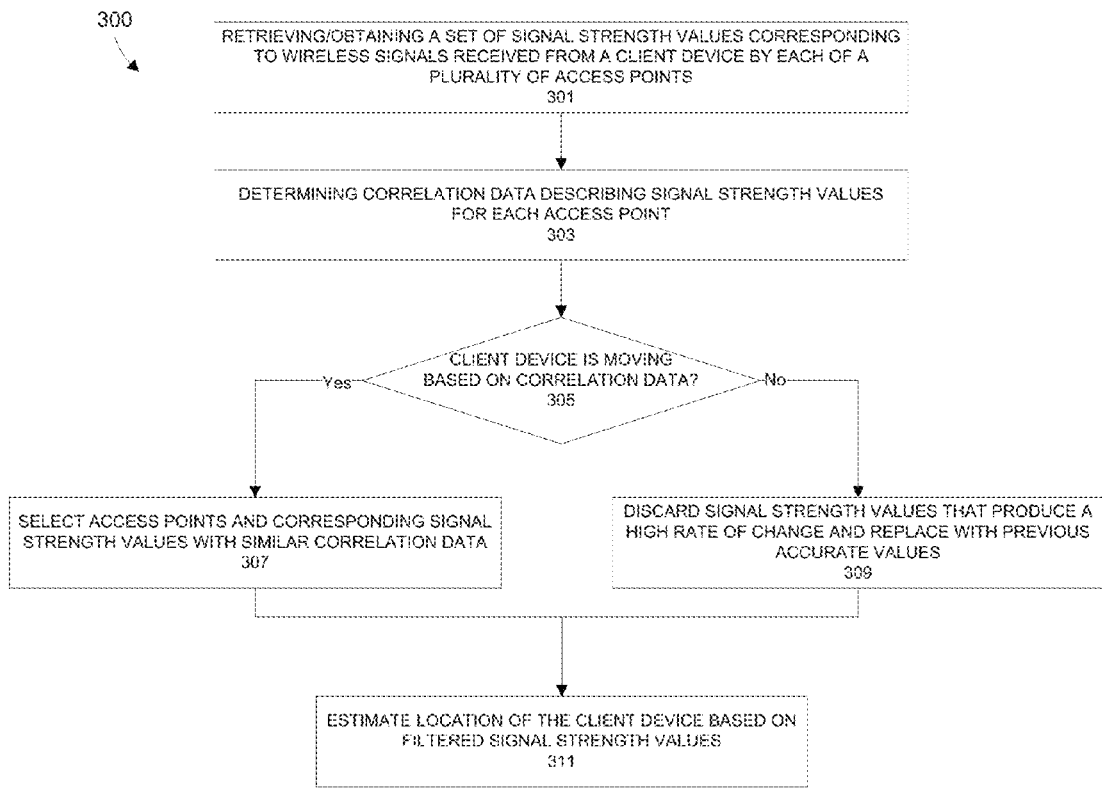
FIG. 3 shows a method for calculating the estimated current location of a client device by filtering signal strength values according to one embodiment.

Calculating the Location of the Client Device 103 Based on Signal Strength Differences and/or Rate of Change Data Turning now to FIG. 3, a method 300 for calculating the estimated current location of the client device 103 according to one embodiment will be described. In one embodiment, each operation of the method 300 may be performed by one or more components of the access points $101_1$-$101_4$, the client device 103, the controller 107, and/or the ALE 109. Although the operations of the method 300 are shown and described in a particular order, in other embodiments the operations may be performed in a different order. For example, in some embodiments, the operations of the method 300 may be performed concurrently or during overlapping time periods.

Figure 4A:
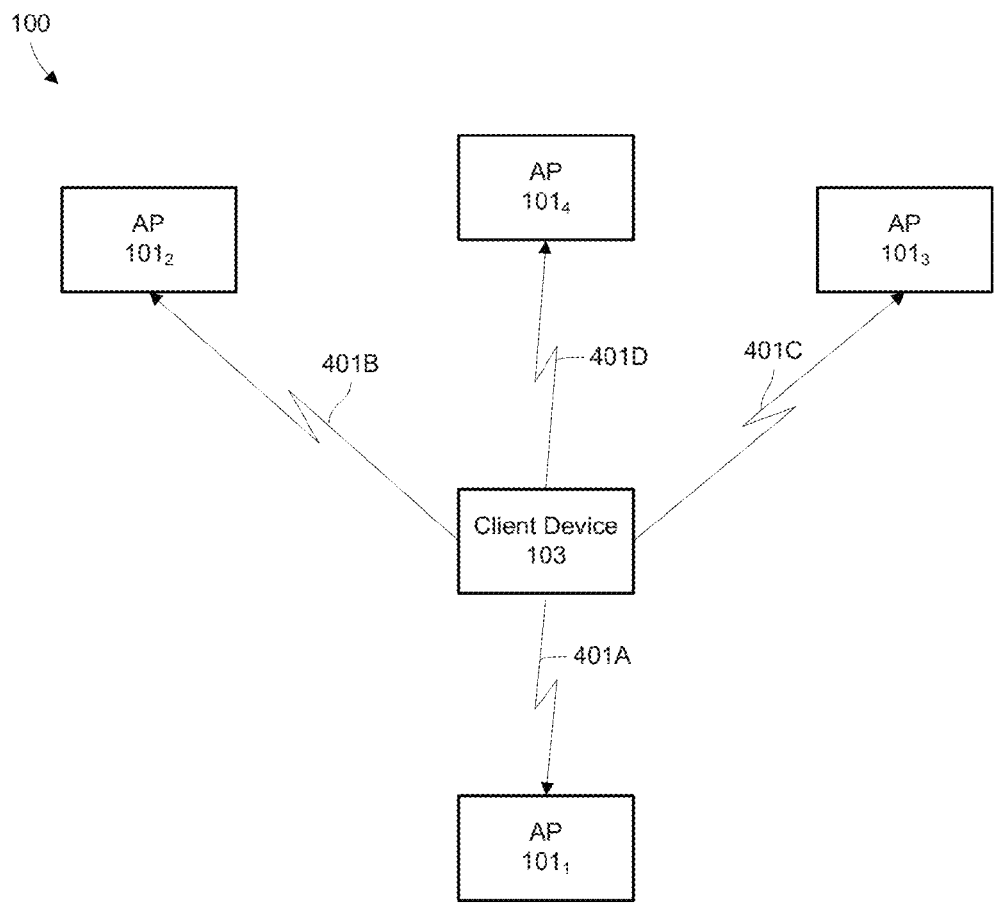
FIG. 4A shows a client device emitting wireless signals for determining the location of the client device according to one embodiment.

In one embodiment, the method 300 begins at operation 301 with the retrieval of one or more pieces of information that describe wireless signals emitted by the client device 103 and received by one or more of the access points $101_1$-$101_4$. In one embodiment, the information may include signal strength values corresponding to the wireless signals received by the access points $101_1$-$101_4$. For example, as shown in FIG. 4A, the client device 103 may transmit wireless signals 401A-401D to the access points $101_1$-$101_4$. The wireless signals 401A-401D may be transmitted by the client device 103 at a predefined power level, which is shared with the access points $101_1$-$101_4$. For instance, the wireless signals 401A-401D may be transmitted to the access points $101_1$-$101_4$ at 20 dB.

In one embodiment, the received signals 401A-401D may be transmitted as part of a data transfer or a communication involving control signals with one or more of the access points $101_1$-$101_4$. For example, the signals 401A-401D may be part of a wireless data transfer or a communication of control signals using an established data connection between the client device 103 and the access point $101_2$ (e.g., a data connection using one or more network protocols). These wireless signals 401A-401D may be detected by the access points $101_1$-$101_4$ even though the access points $101_1$, $101_3$, and $101_4$ and the client device 103 have not established a data connection. Although described as being related to a data transfer, in other embodiments the wireless signals 401A-401D may be a beacon transmitted by the client device 103 with the intended purpose of determining the current location of the client device 103. Again, these wireless signals 401A-401D may be detected by the access points $101_1$-$101_4$ even though the access points $101_1$, $101_3$, and $101_4$ and the client device 103 may not have established a data connection.

As noted above, the information received at operation 301 includes signal strength data. For example, in one embodiment, the data received at operation 301 may include received signal strength indicators (RSSIs) associated with the wireless signals 401A-401D. The RSSI values describe the strength of the wireless signals 401A-401D upon receipt by corresponding access points $101_1$-$101_4$. Since these signals 401A-401D have traversed some distance between the client device 103 and each respective access point $101_1$-$101_4$, the signals 401 may attenuate and decrease in power. For instance, although the signals 401A-401D may have originally been transmitted at 20 dB, the power of the wireless signal 401A received by the access point $101_1$ may be 18 dB, the power of the wireless signal 401B received by the access point $101_2$ may be 15 dB, the power of the wireless signal 401C received by the access point $101_3$ may be 16 dB, and the power of the wireless signal 401D received by the access point $101_4$ may be 19 dB.

As noted above, the access points $101_1$-$101_4$ may be aware of the power with which the signals 401A-401D were originally transmitted by the client device 103 (e.g., 20 dB). This transmitting power may be shared prior to transmitting the signals 401A-401D or the signals 401A-401D may themselves include this power information encoded therein.

Although described above in relation to a single signal strength value for each access point $101_1$-$101_4$, the information received at operation 301 may include multiple signal strength values for each of the access points $101_1$-$101_4$. These multiple values correspond to multiple sets of wireless signals 401A-401D received by each associated access point $101_1$-$101_4$ over time. For example, Table 1 below shows an example set of signal strength values (e.g., RSSIs) that may be retrieved/obtained at operation 301.

TABLE 1

| Access Point ID | RSSI Values (dB) |
| --- | --- |
| Access Point $101_1$ | (18, 17, 17, 18) |
| Access Point $101_2$ | (14, 15, 14, 22) |
| Access Point $101_3$ | (16, 17, 17, 15) |
| Access Point $101_4$ | (19, 17, 18, 19) |

The signal strength values listed in Table 1 correspond to separate points in time. Accordingly, the first signal strength value listed for each access point $101_1$-$101_4$ corresponds to time T1, the second signal strength value listed for each access point $101_1$-$101_4$ corresponds to time T2, the third signal strength value listed for each access point $101_1$-$101_4$ corresponds to time T3, and the fourth signal strength value listed for each access point $101_1$-$101_4$ corresponds to time T4. In one embodiment, each of the signal strength values shown in Table 1 is transmitted by each corresponding access point $101_1$-$101_4$ to the ALE 109 over time. Accordingly, the ALE 109 may collect and store signal strength values for computing the location of the client device 103.

Following operation 301, operation 303 may determine a correlation between the one or more signal strength values received at operation 301. For example, operation 303 may determine 1) a difference value between a set of signal strength values for each individual access point $101_1$-$101_4$ and/or 2) a rate of change between the signal strength values for each individual access point $101_1$-$101_4$. These computed values may be used for determining/defining the correlation between signal strength values for each access point $101_1$-$101_4$.

For example, in one embodiment, operation 303 may compute the difference between the two most recent signal strength values for the access points $101_1$-$101_4$ (e.g., the two rightmost signal strength values in Table 1 associated with each of the access points $101_1$-$101_4$). Using the example dataset in Table 1, the difference between the two most recent signal strength values for the access point $101_1$ would be 1 dB (i.e., 18 dB-17 dB), the difference between two most recent signal strength values for the access point $101_2$ would be 8 dB (i.e., 22 dB-14 dB), the difference between the two most recent signal strength values for the access point $101_3$ would be −2 dB (i.e., 15 dB-17 dB), and the difference between the two most recent signal strength values for the access point $101_4$ would be 1 dB (i.e., 19 dB-18 dB).

In one embodiment, the computed differences between signal strength values for each access point $101_1$-$101_4$ may be compared against a predefined difference threshold to determine whether the signal strength values for a particular access point $101_1$-$101_4$ are correlated. For example, the predefined difference threshold may be 2 dB. In one embodiment, an absolute value of the difference values may be used for comparison such that a general variance can be observed. Since the absolute value of the differences 1 dB, −2 dB, and 1 dB corresponding to the access points $101_1$, $101_3$, and $101_4$, respectively, are equal or below the difference threshold value of 2 dB, operation 303 may determine that the two most recent signal strength values for the access points $101_1$, $101_3$, and $101_4$ are highly correlated. In contrast, since the difference of 8 dB for the access point $101_2$ is above the difference threshold value, operation 303 may determine that the two most recent signal strength values for the access point $101_2$ have a low correlation and/or are not correlated.

As noted above, instead of determining a strict difference between the two most recent signal strength values for each access point $101_1$-$101_4$, operation 303 may determine a rate of change for the signal strength values in relation to each access point $101_1$-$101_4$. This rate of change may thereafter be used to determine correlation. In one embodiment, the last two signal strength values for each of the access points $101_1$-$101_4$ and associated times for each of the signal strength values, may be used to compute a rate of change for each of the access points $101_1$-$101_4$. For the example dataset provided above in Table 1, the two most recent signal strength values for the access points $101_1$-$101_4$ may represent detected values at 3:01 PM and 3:02 PM, respectively. Accordingly, the rate of change of the signal strength values for the access point $101_1$ may be computed as:

$$\text{rate of change} = \frac{\text{Signal Strength Change}}{\text{Time Change}}$$

$$\text{rate of change} = \frac{18 \text{ dB} - 17 \text{ dB}}{3:02 \text{ PM} - 3:01 \text{ PM}}$$

$$\text{rate of change} = 1 \text{ db/minute}$$

Similarly, the rate of changes for the access points $101_2$-$101_4$ may be 8 dB/minute, −2 dB/minute, and 1 dB/minute, respectively. The computed rates of change may be compared against a predefined rate of change threshold to determine whether the signal strength values for each of the access points $101_1$-$101_4$ are correlated. In one embodiment, an absolute value of the rates of change may be used for comparison such that a general variance can be observed. For example, the predefined rate of change threshold may be 2 dB/minute. Since the absolute value of the rates of change of 1 dB/minute, −2 dB/minute, and 1 dB/minute, corresponding to the access points $101_1$, $101_3$, and $101_4$, respectively, are equal or below this rate of change threshold value, operation 303 may determine that the most recent signal strength values for the access points $101_1$, $101_3$, and $101_4$ are highly correlated. In contrast, the rate of change of signal strength values for the access point $101_2$ may be 8 dB/minute. In this case, since the rate of change for the signal strength values of the access point $101_2$ is above the rate of change threshold value, operation 303 may determine that the most recent signal strength values for the access point $101_2$ have a low correlation and/or are not correlated.

Although described above in relation to a pair of signal strength values for each of the access points $101_1$-$101_4$, in other embodiments three or more signal strength values for each of the access points $101_1$-$101_4$ may be used to determine differences/rates of change and corresponding correlations between these datasets.

As described above, although operation 303 may utilize difference or rate of change information to determine signal strength correlation, the method 300 will be further explained below in relation to only difference information. However, it is understood that rate of change information or any other data used to describe correlation may be similarly used in place of these difference values.

On the basis of the correlation data computed at operation 303 and/or the original signal strength values obtained at operation 301, operation 305 may determine if the client device 103 has moved between readings of signal strength values. A move of the client device 103 may be exemplified by significant changes in signal strength values for a majority of the access points $101_1$-$101_4$ that result in the signal strength values having low or no correlation. For example, operation 305 may examine the correlation data computed at operation 303 for each access point $101_1$-$101_4$ to determine if there is a low correlation between the most recent signal strength values for a majority of the access points $101_1$-$101_4$. For example, based on Table 1 above, the signal strength values for the access points $101_1$, $101_3$, and $101_4$ may show a high correlation as described above. Based on this high correlation between signal strength values recorded for each these access points $101_1$, $101_3$, and $101_4$, operation 305 may conclude that the client device 103 is not moving during a time period between the last two signal strength values. In particular, since the signal strength values for the access points $101_1$, $101_3$, and $101_4$ do not indicate a large difference or rate of change, the client device 103 is likely stable between successive signal strength value readings. In the example dataset presented in Table 1, the signal strength values for the access point $101_2$ indicate a low correlation as described above in relation to operation 303. Although there is a low correlation for signal strength readings for this access point $101_2$, which under some circumstances would indicate movement of the client device 103, one or more of the signal strength values for this access point $101_2$ may be considered an outlier or an anomaly in the face of the high correlation determined for the access points $101_1$, $101_3$, and $101_4$. In particular, since more of the access points $101_1$-$101_4$ have a high correlation for respective signal strength values taken at designated times, the client device 103 may be determined to be stable or not moving despite the low correlation for the signal strength values associated with the access point $101_2$.

It should be noted that although the client device 103 is determined not to be moving during successive signal strength readings, the slight movement in these values may be the result of jitter or other minor variances. Accordingly, by comparing these differences or rates of changes against a threshold, the method 300 may avoid a determination that the client device 103 has moved when in fact the changes were the result of system irregularities.

Table 2 below shows another example dataset for the access points $101_1$-$101_4$.

TABLE 2

| Access Point ID | RSSI Values (dB) |
| --- | --- |
| Access Point $101_1$ | (18, 17, 17, 30) |
| Access Point $101_2$ | (14, 15, 14, 26) |
| Access Point $101_3$ | (16, 17, 17, 44) |
| Access Point $101_4$ | (19, 17, 19, 32) |

Based on the dataset shown in Table 2, the access points $101_1$-$101_4$ have differences between the two most recent signal strength values of 13 dB, 12 dB, 27 dB, and 13 dB, respectively. On the basis of these differences, operation 303 may determine that the access points $101_1$-$101_4$ have low correlations between the two most recent signal strength values for each of the access points $101_1$-$101_4$. On the basis of these low correlations, operation 305 may determine that the client device 103 has moved between the period of time the last two signal strength values were detected for each access point $101_1$-$101_4$.

Table 3 below shows another example dataset for the access points $101_1$-$101_4$.

TABLE 3

| Access Point ID | RSSI Values (dB) |
| --- | --- |
| Access Point $101_1$ | (18, 17, 17, 30) |
| Access Point $101_2$ | (14, 15, 14, 26) |
| Access Point $101_3$ | (16, 17, 17, 19) |
| Access Point $101_4$ | (19, 17, 19, 32) |

Based on the dataset shown in Table 3, the access points $101_1$-$101_4$ have differences between the two most recent signal strength values of 13 dB, 12 dB, 2 dB, and 13 dB, respectively. On the basis of this dataset, operation 303 may determine that the access points $101_1$, $101_2$, and $101_4$ have low correlations between the two most recent signal strength values. In contrast, the access points $101_3$ may have a difference between the two most recent signal strength values of 2 dB. On the basis of this relatively small difference, operation 303 may have determined a high correlation between signal strength values for this access point $101_3$. Even though the access point $101_3$ exhibited a high correlation between signal strength values, operation 305 may still determine that the client device 103 has moved between the period of time the two most recent signal strength values were detected based on the low correlation of signal strength values for a majority of the access points $101_1$-$101_4$ (e.g., the access points $101_1$, $101_2$, and $101_4$).

Upon determining that the client device 103 has moved at operation 305, the method 300 may move to operation 307. At operation 307, a set of access points $101_1$-$101_4$ and corresponding signal strength values are selected to determine the location of the client device 103. In one embodiment, the selection of access points $101_1$-$101_4$ may be based on the magnitude/amount of movement of the client device 103 suggested by each set of signal strength values for each access point $101_1$-$101_4$. In particular, a similar difference or rate of change between signal strength values may be used to select a set of access points $101_1$-$101_4$ and corresponding signal strength values.

For example, in the dataset shown in Table 2, the signal strength values for each of the access points $101_1$-$101_4$ indicate that the client device 103 has moved between the period of time the last two signal strength values for each access point $101_1$-$101_4$ were detected. Although the signal strength values for each of the access points $101_1$-$101_4$ lead to the same general conclusion (i.e., movement of the client device 103), the amount of movement for the client device 103 suggested by the access points $101_1$, $101_2$, and $101_4$ (e.g., 13 dB, 12 dB, and 13 dB) are closer in magnitude than the amount of movement for the client device 103 suggested by the access point $101_3$ (e.g., 27 dB). In terms of distance of movement, the access points $101_1$, $101_2$, and $101_4$ may suggest that the client device 103 has moved 5 meters while the access point $101_3$ may suggest that the client device 103 has moved 10 meters.

Since the signal strength values for the access point $101_3$ suggest a magnitude of movement far greater than the signal strength values for the access points $101_1$, $101_2$, and $101_4$, operation 307 may discard the values for access point $101_3$ in favor of the signal strength values for the access points $101_1$, $101_2$, and $101_4$. Since signal strength values are only needed from three access points $101_1$-$101_4$ to accurately triangulate the position of the client device 103, discarding the signal strength values of the access point $101_3$ should not negatively affect location estimation of the client device 103.

In one embodiment, where each of the access points $101_1$-$101_4$ return similarly lowly correlated values and/or indicate movement of the client device 103 with similar magnitudes, operation 307 may select access points $101_1$-$101_4$ with the highest signal strength values. Generally, the stronger the signal strength values, the more accurate the reading. This increased accuracy is based on the close positioning of the client device 103 to the corresponding access point $101_1$-$101_4$, which yield this stronger/greater signal strength value. In particular, the transmitted signal has less distance to attenuate and be generally altered.

Returning again to operation 305, upon determining that the client device 103 has not moved, the method 300 may move to operation 309. At operation 309, the method 300 may discard individual signal strength values that have resulted in a low correlation between signal strength values of a corresponding access point $101_1$-$101_4$. For example, in the dataset shown in Table 1 above, the two most recent signal strength values for the access point $101_2$ generate a difference of 8 dB. As noted above, this difference value may indicate a low correlation (i.e., a difference greater than the difference threshold) and corresponding movement of the client device 103. Since the signal strength values for the other access points $101_1$, $101_3$, and $101_4$ have indicated that the client device 103 is likely not moving, the method 300 may conclude that one or more signal strength values associated with the access point $101_2$ are inaccurate. At operation 309, the inaccurate signal strength values may be discarded.

In one embodiment, operation 309 may discard the last detected signal strength value and replace this discarded value with the previous signal strength value. For example, in the dataset shown in Table 1, the signal strength values (14, 15, 14, 22) corresponding to the access point $101_2$ may be replaced with the signal strength values (14, 15, 14, 14). Since only the last known signal strength value is determined to be inaccurate and the client device 103 has been determined to not have moved since the previous detected signal strength value, replacing the last detected signal strength value with the previous signal strength value should produce an accurate estimation of the location of the client device 103.

Although described as discarding and replacing particular signal strength values, in some embodiments operation 309 may select particular access points $101_1$-$101_4$ with corresponding sets of signal strength values in a similar fashion as described above in relation to operation 307. In one embodiment, the selection of access points $101_1$-$101_4$ and corresponding sets of signal strength values may be based on correlation data computed at operation 303. For example, in the dataset shown in Table 1, the differences between signal strength values for the access points $101_1$-$101_4$ are 1 dB, 8 dB, 2 dB, and 1 dB, respectively. Accordingly, the differences for the access points $101_1$, $101_3$, and $101_4$ are between 1 dB-2 dB. In contrast, the difference for the access point $101_2$ is 8 dB. Accordingly, the difference value for the access point $101_2$ is on the order of 2-4 times that of the difference values for the access points $101_1$, $101_3$, and $101_4$. Based on this level of dissimilarity, operation 309 may select the access points $101_1$, $101_3$, and $101_4$ and corresponding sets of signal strength values and discard the signal strength values associated with the access point $101_2$.

In one embodiment, where each of the access points $101_1$-$101_4$ return similarly highly correlated values, operation 309 may select access points $101_1$-$101_4$ with the highest signal strength values. As noted above, the stronger the signal strength values, the more accurate the reading. This increased accuracy is based on the close positioning of the client device 103 to the corresponding access point $101_1$-$101_4$, which yield this stronger/greater signal strength value. In particular, the transmitted signal has less distance to attenuate and be generally altered.

Although described as simultaneously analyzing a set of signal strength values corresponding to four separate access points $101_1$-$101_4$, in some embodiments the method 300 may first analyze a set of signal strength values corresponding to three separate access points $101_1$-$101_3$. Upon determining that one of the access points $101_1$-$101_3$ is returning inaccurate signal strength values, signal strength values for a fourth access point $101_4$ may be retrieved and analyzed.

Following selection of three access points 101 with corresponding sets of signal strength values at either operation 307 or operation 309, operation 311 may estimate the location of the client device 103 based on the selected signal strength values. Based on the determined power of the wireless signals 401 at receipt and knowledge of the power of the signals 401 at transmission, each of the selected access points 101 may determine a distance or range separating the client device 103 and each respective access point 101. As shown in FIG. 4B the access points $101_1$-$101_3$ may be selected for location estimation of the client device 103 at operations 307 or 309. The estimated distance between each of the access points $101_1$-$101_3$ and the client device 103 may be represented by the circles 407A-407C, where the radius of the circles 407A-407C indicate the estimated distance between the client device 103 and each respective access point $101_1$-$101_3$. These distance estimates may be determined based on 1) estimated transfer function(s) describing signal propagation/degradation between the client device 103 and the access points $101_1$-$101_3$ and/or 2) a table mapping signal attenuation to distance estimates. Although described as a single distance estimate between the client device 103 and the access points $101_1$-$101_3$, in some embodiments, a distance range may be provided.

As shown in FIG. 4B, the estimated current location of the client device 103 may be the location $X_D$, which falls in the intersection between the circles 407A-407C. In one embodiment, the estimated current location of the client device 103 may be relative to one or more of the access points $101_1$-$101_3$. In another embodiment, based on knowledge of the location of one or more of the access points $101_1$-$101_3$, the detected current location may be relative to another object (e.g., a landmark), an area (e.g., a room in which the client device 103 and/or the access points $101_1$-$101_3$ are located, a campus, or the entire earth (i.e., GPS coordinates)).

As described above, the estimated location of the client device 103 is computed based on filtered signal strength values for corresponding access points $101_1$-$101_4$. By filtering signal strength values through a heuristic and intra-access point $101_1$-$101_4$ analysis, the method 300 eliminates inaccurate or anomalistic values, which may negatively alter the estimated location of the client device 103. Accordingly, the method 300 may produce more accurate client device 103 location estimates by intelligently examining detected values.

Figure 5:
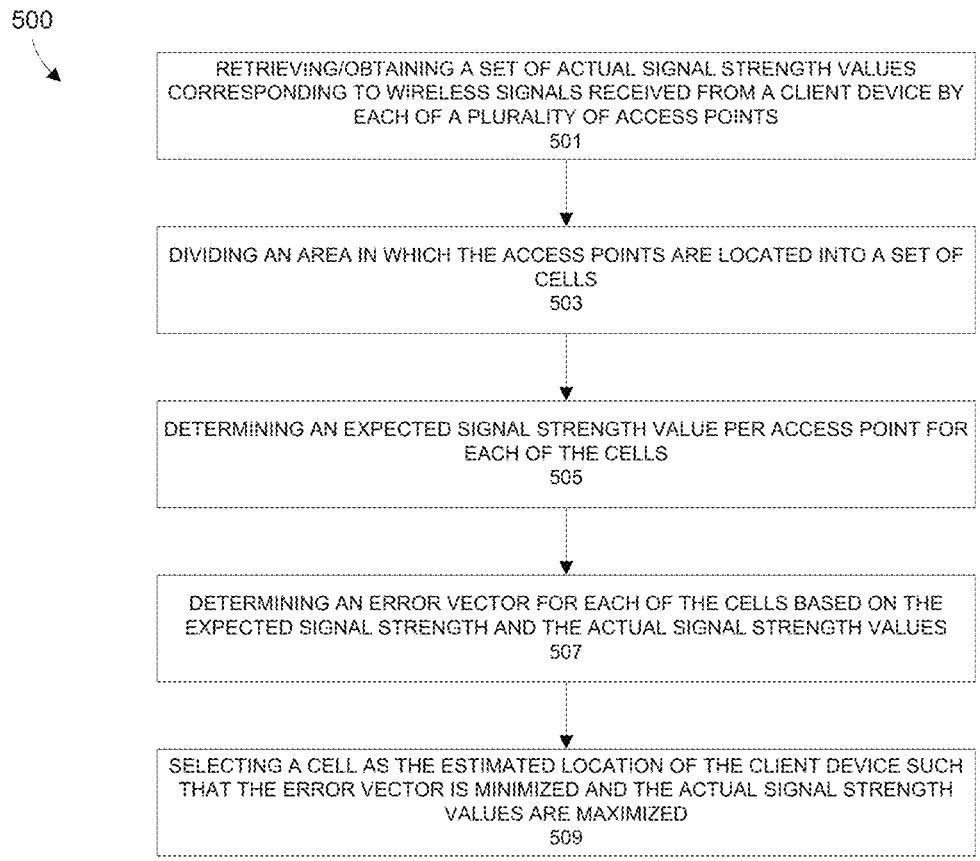
FIG. 5 shows a method for calculating the estimated current location of the client device using error vectors for filtering signal strength values according to one embodiment.

Calculating the Location of the Client Device 103 Based on Signal Strength Value Error Vectors Turning now to FIG. 5, a method 500 for calculating the estimated current location of the client device 103 according to one embodiment will be described. In one embodiment, each operation of the method 500 may be performed by one or more components of the access points $101_1$-$101_4$, the client device 103, the controller 107, and/or the ALE 109. Although the operations of the method 500 are shown and described in a particular order, in other embodiments the operations may be performed in a different order. For example, in some embodiments, the operations of the method 500 may be performed concurrently or during overlapping time periods.

The method 500 may commence at operation 501 with retrieval of one or more pieces of information that describe wireless signals emitted by the client device 103 and received by one or more of the access points $101_1$-$101_4$. Operation 501 may be performed in a similar fashion as operation 301 described above. In one embodiment, the information retrieved at operation 501 may include signal strength values corresponding to the wireless signals received by the access points $101_1$-$101_4$. For example, Table 4 shows a set of signal strength values that may be retrieved at operation 501.

TABLE 4

| Access Point ID | RSSI Values (dB) |
| --- | --- |
| Access Point $101_1$ | 18 |
| Access Point $101_2$ | 22 |
| Access Point $101_3$ | 15 |
| Access Point $101_4$ | 19 |

Each of the signal strength values correspond to a single shared time. Accordingly, the signal strength values may be used to estimate the location of the client device 103 at this shared time.

Figure 6A:
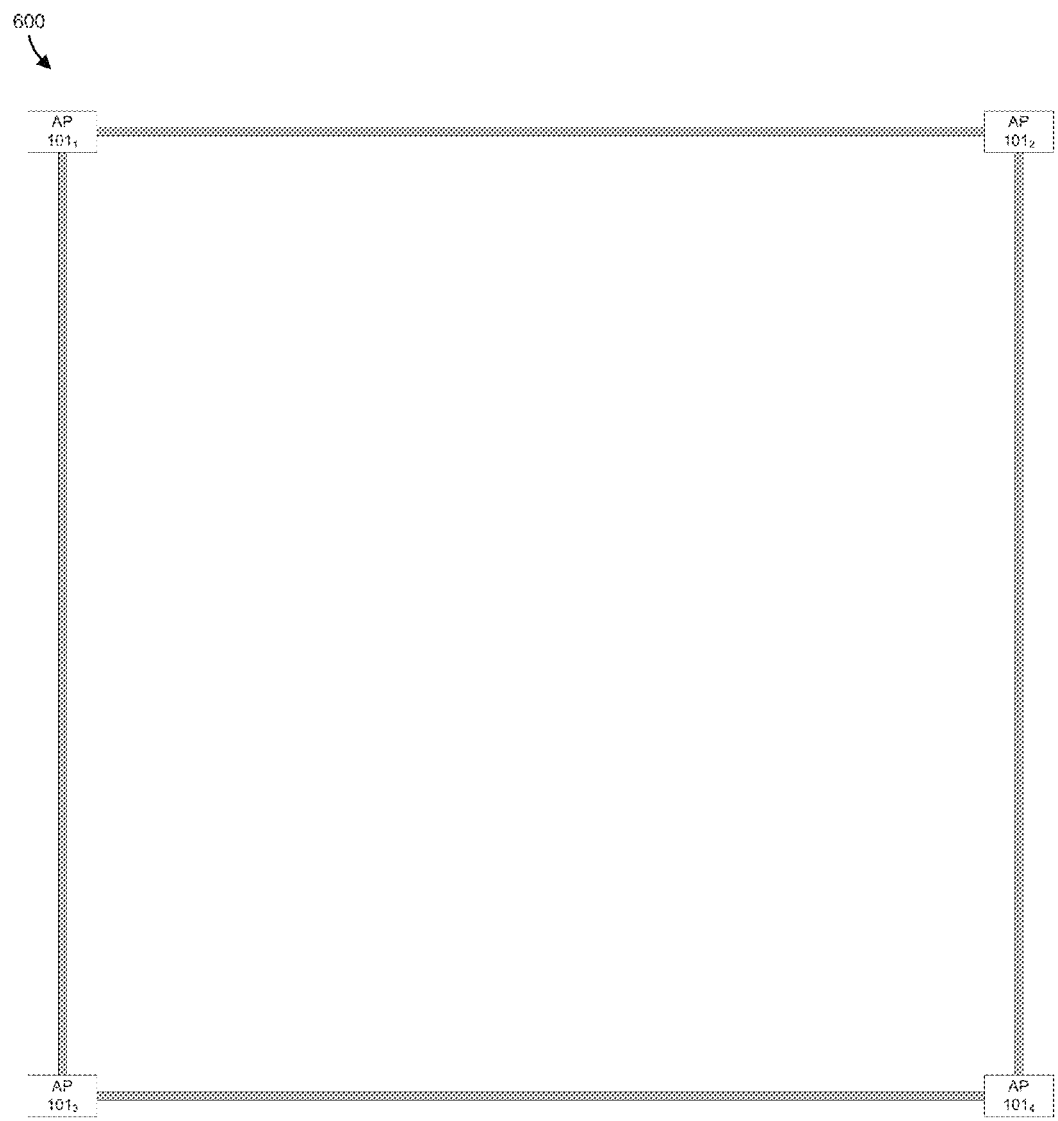
FIG. 6A shows an example of an area in which multiple access points are located according to one embodiment.
Figure 6B:
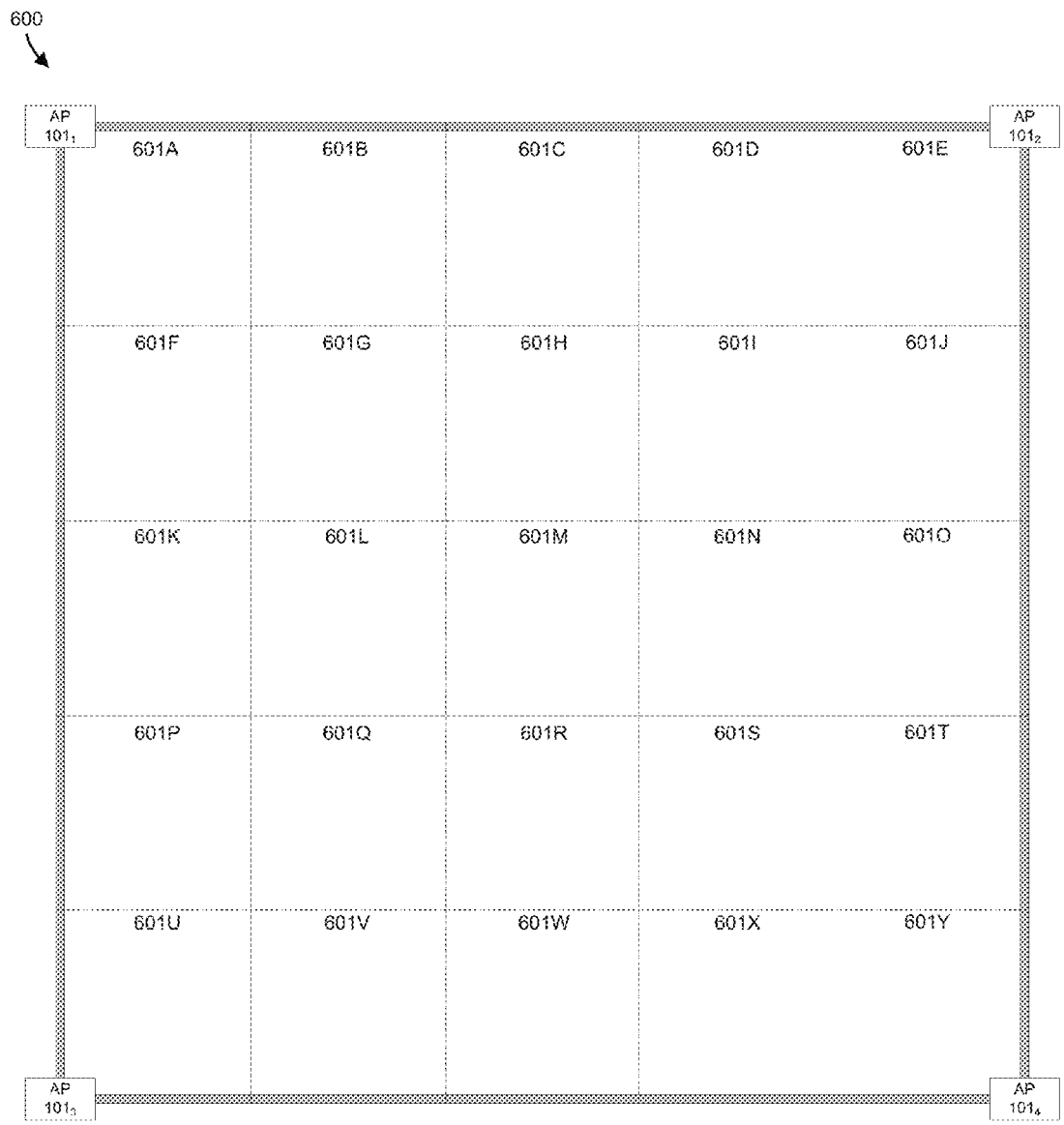
FIG. 6B shows the example area split into multiple cells according to one embodiment.

Following operation 501, operation 503 may divide the area/location in which the access points $101_1$-$101_4$ are located into a set of equally sized cells. In this embodiment, the location of each of the access points $101_1$-$101_4$ is known. FIG. 6A shows an example of an area 600 in which the access points $101_1$-$101_4$ are located. The area 600 may be an office, a floor of a building, a campus, or any other environment in which the access points $101_1$-$101_4$ are installed. As shown in FIG. 6B, the area 600 may be divided into twenty-five cells 601A-601Y.

At operation 505, expected signal strength values may be computed for each of the cells 601. The expected signal strength values represent the signal strength of wireless signals transmitted by each of the access points $101_1$-$101_4$ after the signals have propagated through the area 600 to each corresponding cell 601A-601Y. In one embodiment, the expected signal strength value for a cell 601A-601Y located a distance d from a corresponding access point $101_1$-$101_4$ may be calculated based on the path loss equation below:

Expected Path Loss=$k+10 \times n \log(d)$

In the above equation, d may be the distance a wireless signal travels and the values k and n may be estimated for the environment in which the access points $101_1$-$101_4$ are located. For example, in indoor environments, k may be 40 and n may be 4. Based on the expected path loss, the expected signal strength values for each of the cells 601A-601Y may be calculated and associated with each cell 601A-601Y as shown in FIG. 6C.

Following calculation of expected signal strength values at operation 505, operation 507 may determine an error vector for each cell 601A-601Y in the area 600 as shown in FIG. 6C. In one embodiment, the error vector may be calculated based on the expected signal strength values calculated at operation 505 and the actual signal strength values retrieved at operation 501. In particular, the error vector may be calculated as the difference between the expected signal strength values for each access point $101_1$-$101_4$ and the actual signal strength values. The error vector represents the likelihood the client device 103 is in each cell 601A-601Y based on the actual signal strength values. Accordingly, low error vector values may indicate a strong likelihood that the client device 103 is located in a particular cell 601.

At operation 509, a cell 601 may be selected as the estimated location of the client device 103. In one embodiment, the selection at operation 509 may be performed to minimize error vector values (or minimize the absolute value of the error vector values) while maximizing the actual signal strength values received for a particular cell 601A-601Y. Generally, the stronger the signal strength values, the more accurate the reading. This increased accuracy is based on the close positioning of the client device 103 to the corresponding access point $101_1$-$101_4$, which yield this stronger/greater signal strength value. In particular, the transmitted signal has less distance to attenuate and be generally altered by the characteristics of the area 600.

As described above, the estimated location of the client device 103 is computed based on determining error vectors and selecting the cell 601 within the area with the lowest error vector values. By filtering/selecting a cell 601 in this fashion, the method 500 eliminates signal strength values that are likely inaccurate. Accordingly, the method 300 may produce more accurate client device 103 location estimates by intelligently examining detected values.

An embodiment of the invention may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components. Also, although the discussion focuses on uplink medium control with respect to frame aggregation, it is contemplated that control of other types of messages are applicable.

Any combination of the above features and functionalities may used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A non-transitory computer readable medium comprising instructions which, when executed by one or more hardware processors, cause the one or more hardware processors to:
 obtain information comprising a set of signal strength values corresponding to wireless signals received from a client device by each of a plurality of network devices over multiple instances of time;
 determine, for each of the plurality of network devices, a correlation between the signal strength values corresponding to the wireless signals received from the client device by the network device over the multiple instances of time;
 determine whether a determined correlation for a network device of the plurality of network devices deviates from the other determined correlations beyond a predetermined threshold value;
 select a subset of the plurality of network devices having determined correlations that are within the predetermined threshold value in response to a determination that a determined correlation for a network device of the plurality of network devices deviates from the other determined correlations beyond a predetermined threshold value;
 estimate distances between the client device and the selected subset of the plurality of network devices based upon the signal strength values corresponding to the wireless signals received from the client device by the network devices in the selected subset of the plurality of network devices; and
 estimate a location of the client device based on the locations of each of the network devices in the selected subset of the plurality of network devices.

2. The medium of claim 1, wherein the instructions are to cause the one or more hardware processors to:
 for each network device in the plurality of network devices, determine a difference value between (a) a first signal strength value of a first wireless signal received from the client device at a first instance of time and (b) a second signal strength value of a second wireless signal received from the client device at a second instance of time, wherein the difference value is the correlation between the signal strength values for the network device; and
 wherein to determine whether the determined correlation for a network device deviates from the other determined correlations, the instructions are to cause the one or more hardware processors to determine whether the difference value for the network device deviates from the other determined difference values of the other network devices beyond a predetermined threshold difference value.

3. The medium of claim 1, wherein the instructions are to cause the one or more hardware processors to:
 for each network device in the plurality of network devices, determine a rate-of-change value between (a) a first signal strength value of a first wireless signal received from the client device at a first instance of time and (b) a second signal strength value of a second wireless signal received from the client device at a second instance of time, wherein the rate-of-change value is the correlation between the signal strength values for the network device; and wherein to determine whether the determined correlation for a network device deviates from the other determined correlations, the instructions are to cause the one or more hardware processors to determine whether the rate-of-change value for the network device deviates from the other determined rate-of-change values of the other network devices beyond a predetermined threshold rate-of-change value.

4. The medium of claim 1, wherein the instructions are to cause the one or more hardware processors to:

for each network device in the plurality of network devices, determine a first rate-of-change value between a first set of signal strength values corresponding to a first set of wireless signals received from the client device and determine a second rate-of-change value between a second set of signal strength values corresponding to a second set of wireless signals received from the client device; and based on the difference between first rate-of-change value and the second rate-of-change value, determine whether to include the network device in the selected subset of the plurality of network devices.

5. The medium of claim 1, wherein the instructions are to cause the one or more hardware processors to dynamically modify the selected subset of the plurality of network devices based on the determined correlations for the plurality of network devices.

6. The medium of claim 1, wherein the instructions are to cause the one or more hardware processors to estimate the location of the client device based on (a) signal strength values for a set of last-received wireless signals received by at least two network devices in the selected subset of the plurality of network devices and (b) a signal strength value for a wireless signal that is different than a last-received wireless signal received by another network device.

7. The medium of claim 1, wherein the instructions are to cause the one or more hardware processors to:

determine whether the client device is moving based upon the determined correlations; and in response to a determination that the client device is moving, discard signal strength values in the set of signal strength values that have a high rate of change from other signal strength values prior to the estimation of the location of the client device.

8. A device comprising:

a hardware processor;

a memory on which is stored instructions that are to cause the processor to:

obtain information comprising a set of signal strength values corresponding to wireless signals received from a client device by each of a plurality of network devices over multiple instances of time;

determine, for each of the plurality of network devices, a correlation between the signal strength values corresponding to the wireless signals received from the client device by the network device over the multiple instances of time;

determine that a determined correlation for a network device of the plurality of network devices deviates from the other determined correlations beyond a predetermined threshold value;

select a subset of the plurality of network devices having determined correlations that are within the predetermined threshold value;

estimate distances between the client device and the selected subset of the plurality of network devices based upon the signal strength values corresponding to the wireless signals received from the client device by the network devices in the selected subset of the plurality of network devices; and estimate a location of the client device based on the locations of each of the network devices in the selected subset of the plurality of network devices.

9. The device of claim 8, wherein the instructions are to cause the hardware processor to:

for each network device in the plurality of network devices, determine a difference value between (a) a first signal strength value of a first wireless signal received from the client device at a first instance of time and (b) a second signal strength value of a second wireless signal received from the client device at a second instance of time, wherein the difference value is the correlation between the signal strength values for the network device; and wherein to determine whether the determined correlation for a network device deviates from the other determined correlations, the instructions are to cause the one or more hardware processors to determine whether the difference value for the network device deviates from the other determined difference values of the other network devices beyond a predetermined threshold difference value.

10. The device of claim 8, wherein the instructions are to cause the hardware processor to:

for each network device in the plurality of network devices, determine a rate-of-change value between (a) a first signal strength value of a first wireless signal received from the client device at a first instance of time and (b) a second signal strength value of a second wireless signal received from the client device at a second instance of time, wherein the rate-of-change value is the correlation between the signal strength values for the network device; and wherein to determine whether the determined correlation for a network device deviates from the other determined correlations, the instructions are to cause the one or more hardware processors to determine whether the rate-of-change value for the network device deviates from the other determined rate-of-change values of the other network devices beyond a predetermined threshold rate-of-change value.

11. The device of claim 8, wherein the instructions are to cause the hardware processor to:

for each network device in the plurality of network devices, determining determine a first rate-of-change value between a first set of signal strength values corresponding to a first set of wireless signals received from the client device and determine a second rate-of-change value between a second set of signal strength values corresponding to a second set of wireless signals received from the client device; and based on the difference between first rate-of-change value and the second rate-of-change value, determine whether to include the network device in the selected subset of the plurality of network devices.

12. The device of claim 8, wherein the instructions are to cause the hardware processor to dynamically modify the selected subset of the plurality of network devices based on the determined correlations for the plurality of network devices.

13. The device of claim 8, wherein the instructions are to cause the hardware processor to estimate the location of the client device based on (a) signal strength values for a set of last-received wireless signals received by at least two network devices in the selected subset of the plurality of network devices and (b) a signal strength value for a wireless signal that is different than a last-received wireless signal received by another network device.

14. The device of claim 8, wherein the instructions are to cause the hardware processor to:
    determine whether the client device is moving based upon the determined correlations; and
    in response to a determination that the client device is moving, discard signal strength values in the set of signal strength values that have a high rate of change from other signal strength values prior to the estimation of the location of the client device.

\* \* \* \* \*